(12) United States Patent
Kim et al.

(10) Patent No.: US 9,851,154 B2
(45) Date of Patent: Dec. 26, 2017

(54) CONDENSER FOR VEHICLE

(75) Inventors: Jae Yeon Kim, Hwaseong-si (KR); Wan Je Cho, Suwon-si (KR); Man Hee Park, Suwon-si (KR); Seok Jin Park, Asan-si (KR)

(73) Assignees: Hyundai Motor Company, Seoul (KR); Doowon Climate Control Co., Ltd., Asain-si (KR)

( * ) Notice: Subject to any disclaimer, the term of this patent is extended or adjusted under 35 U.S.C. 154(b) by 1698 days.

(21) Appl. No.: 13/189,178

(22) Filed: Jul. 22, 2011

(65) Prior Publication Data

US 2012/0137725 A1 Jun. 7, 2012

(30) Foreign Application Priority Data

Dec. 3, 2010 (KR) .................. 10-2010-0123056
Dec. 3, 2010 (KR) .................. 10-2010-0123061

(51) Int. Cl.
*F25B 39/04* (2006.01)
*F28D 9/00* (2006.01)
(Continued)

(52) U.S. Cl.
CPC ......... *F28D 9/005* (2013.01); *B60H 1/00342* (2013.01); *F25B 39/04* (2013.01);
(Continued)

(58) Field of Classification Search
CPC .............. F25B 39/04; F25B 2339/0441; F25B 2339/047; F25B 2339/044;
(Continued)

(56) References Cited

U.S. PATENT DOCUMENTS 4,429,547 A * 2/1984 Granryd .................... F24D 3/18
62/183
6,260,379 B1 7/2001 Manwill et al.
(Continued)

FOREIGN PATENT DOCUMENTS

CN 1380203 A 11/2002
CN 1732364 A 2/2006
(Continued)

OTHER PUBLICATIONS

Ap, Ngy-Srun et al., "UltimateCooling™: New Cooling System Concept using the Same Coolant to Cool all Vehicle Fluids," VTMS 6 / IMechE 2003, pp. 661-674.
(Continued)

*Primary Examiner* — Christopher R Zerphey
(74) *Attorney, Agent, or Firm* — Morgan, Lewis & Bockius

(57) ABSTRACT

A condenser for a vehicle includes an integrally formed receiver-drier and a plurality of stacked plates. The condenser may be used in an air conditioning having an expansion valve expanding liquid refrigerant, an evaporator evaporating the refrigerant expanded at the expansion valve through heat-exchange with air, and a compressor receiving from the evaporator and compressing gaseous refrigerant, may be provided between the compressor and the expansion valve, and may circulate coolant supplied from a radiator so as to condense the refrigerant supplied from the compressor through heat-exchange with the coolant and the refrigerant.

9 Claims, 12 Drawing Sheets

(51) Int. Cl.
*B60H 1/00* (2006.01)
*F28D 21/00* (2006.01)

(52) U.S. Cl.
CPC . *F25B 2339/043* (2013.01); *F25B 2339/0441* (2013.01); *F28D 2021/0084* (2013.01)

(58) Field of Classification Search
CPC ...... F25B 2339/0442; F25B 2339/0446; F25B 2400/054; B60H 1/00342; F28D 2021/0084
See application file for complete search history.

(56) References Cited

U.S. PATENT DOCUMENTS

| | | | |
|---|---|---|---|
| 6,491,090 B1 | 12/2002 | Frugier et al. | |
| 6,539,746 B1 | 4/2003 | Haussmann | |
| 7,762,090 B2 * | 7/2010 | Lee | B01D 5/0015 165/113 |
| 2005/0000473 A1 | 1/2005 | Ap et al. | |
| 2005/0082049 A1 | 4/2005 | Brost | |
| 2005/0103047 A1 * | 5/2005 | Forster | F25B 39/04 62/509 |
| 2006/0053833 A1 | 3/2006 | Martins et al. | |
| 2007/0267169 A1 * | 11/2007 | Acre | B60H 1/3227 165/42 |
| 2010/0243200 A1 * | 9/2010 | Baker, Jr. | B60H 1/00342 165/41 |
| 2012/0000236 A1 * | 1/2012 | Ogata | F24D 3/18 62/324.2 |
| 2012/0222846 A1 * | 9/2012 | Kadle | F28D 9/005 165/166 |
| 2012/0234523 A1 * | 9/2012 | Jouanny | F28D 9/005 165/166 |
| 2012/0273179 A1 * | 11/2012 | Tiziano | F25B 39/04 165/166 |
| 2012/0291478 A1 * | 11/2012 | Kim | F25B 39/04 62/507 |
| 2013/0145789 A1 * | 6/2013 | Kim | F25B 39/04 62/239 |
| 2013/0146257 A1 * | 6/2013 | Kim | F25B 39/04 165/104.21 |
| 2013/0146265 A1 * | 6/2013 | Kim | F25B 39/04 165/166 |
| 2014/0102682 A1 * | 4/2014 | Kim | F25B 39/04 165/164 |
| 2014/0110093 A1 * | 4/2014 | Kim | F28F 9/00 165/164 |

FOREIGN PATENT DOCUMENTS

| | | | |
|---|---|---|---|
| CN | 201203309 Y | 3/2009 | |
| EP | 1061319 A1 | 12/2000 | |
| FR | 2947041 * | 6/2009 | ............. F25B 39/04 |
| JP | 06-050144 A | 2/1994 | |
| JP | 9-53866 A | 2/1997 | |
| JP | 10-132476 A | 5/1998 | |
| JP | 10132476 * | 5/1998 | ............... F28D 9/02 |
| JP | 2000-74530 A | 3/2000 | |
| JP | 2000-258082 A | 9/2000 | |
| JP | 2005-114353 A | 4/2005 | |
| JP | 2005-186879 A | 7/2005 | |
| JP | 2005186879 * | 7/2005 | ............... B60H 1/32 |
| JP | 2008-64455 A | 3/2008 | |
| KR | 10-2003-0054364 A | 7/2003 | |
| KR | 10-2003-0056589 A | 7/2003 | |
| KR | 10-2003-0065616 A | 8/2003 | |
| KR | 10-0397045 B1 | 8/2003 | |
| KR | 10-0501141 B1 | 6/2006 | |
| KR | 10-0833481 B1 | 5/2008 | |
| KR | 10-2010-023096 A | 3/2010 | |
| KR | 10-2010-0023600 A | 3/2010 | |
| KR | 10-2011-0062418 A | 6/2011 | |
| WO | WO 01/87656 A1 | 11/2001 | |
| WO | WO 01/88454 A1 | 11/2001 | |

OTHER PUBLICATIONS

Park, Manhee et al., "Air-con system with Water-cooled condenser for improvement of Fuel Economy," Hyundai Motor Group Conference, Sep. 8, 2010.

Vesterlli, Francesco et al., "Secondary cooling circuit with water condenser and water charge air cooler on a Fiat Grande Punto," Mobile Air Conditioning, Associazione Tecnica Dell'Automobile, Third European Workshop, Nov. 2009.

* cited by examiner

CONDENSER FOR VEHICLE

CROSS-REFERENCE TO RELATED APPLICATION

This application claims priority to and the benefit of Korean Patent Applications No. 10-2010-0123056 and 10-2010-0123061 filed Dec. 3, 2010, the entire contents of which applications is incorporated herein for all purposes by this reference.

BACKGROUND OF INVENTION

Field of Invention

The present invention relates to a condenser for a vehicle. More particularly, the present invention relates to a condenser for a vehicle that is stacked-plate type in which a receiver-drier is integrally formed and that is water-cooled type in which a refrigerant is condensed by using a coolant.

Description of Related Art

Generally, an air conditioning for a vehicle maintains suitable cabin temperature regardless of ambient temperature and realizes comfortable indoor environment.

Such an air conditioning includes a compressor compressing a refrigerant, a condenser condensing and liquefying the refrigerant compressed by the compressor, an expansion valve quickly expanding the refrigerant condensed and liquefied by the condenser, and an evaporator evaporating the refrigerant expanded by the expansion valve and cooling air which is supplied to the cabin in which the air conditioning is installed by using evaporation latent heat.

Herein, the condenser cools compressed gas refrigerant of high temperature/pressure by using an outside air flowing into the vehicle when running and condenses it into liquid refrigerant of low temperature.

Such a condenser is generally connected through a pipe to a receiver-drier which is provided for improving condensing efficiency through gas-liquid separation and removing moisture in the refrigerant.

An air-cooled condenser which heat-exchanges with the outside air is mainly used for the condenser for the vehicle. Since such an air-cooled condenser has pin-tube structures, entire size of the condenser may be increased so as to improve cooling performance. Therefore, the air-cooled condenser may be hard to be installed in a small engine compartment.

In order to solve such a problem, a water-cooled condenser which uses coolant as refrigerant is applied to the vehicle.

However, the water-cooled condenser, compared with the air-cooled condenser, has lower condensing temperature of the refrigerant by about 5-15° C., and accordingly difference between the condensing temperature and the ambient temperature is small. Therefore, condensing efficiency may be deteriorated due to small sub-cool effect, and accordingly cooling efficiency may also be deteriorated.

In addition, size of a radiator or capacity of a cooling fan may be increased so as to increase condensing efficiency or cooling efficiency of the water-cooled condenser for the vehicle. Therefore, cost and weight may increase and connections between the receiver-drier and the condenser may be complex.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a condenser for a vehicle having advantages of being integrally formed with a receiver-drier and stacking a plurality of plates.

According to the condenser for the vehicle, dead volume of the receiver-drier may be minimized and heat-radiating area may be increased. Therefore, cooling efficiency may be improved.

In addition, the condenser for the vehicle condenses refrigerant by using coolant and overcools the condensed refrigerant through heat-exchange with gaseous refrigerant of low temperature/pressure supplied from an evaporator. Therefore, additional devices for overcooling the condensed refrigerant can be removed, and accordingly the number of components may be reduced and connections therebetween may be simplified. Thus, cost and weight may be reduced.

A condenser for a vehicle according to exemplary aspects of the present invention may be used in an air conditioning having an expansion valve expanding liquid refrigerant, an evaporator evaporating the refrigerant expanded at the expansion valve through heat-exchange with air, and a compressor receiving from the evaporator and compressing gaseous refrigerant, may be provided between the compressor and the expansion valve, and may circulate coolant supplied from a radiator so as to condense the refrigerant supplied from the compressor through heat-exchange with the coolant and the refrigerant.

The condenser according to various aspects of the present invention may include a first heat-radiating portion formed by stacking a plurality of plates, connected to the radiator so as to circulate the coolant, and circulating the refrigerant supplied from the compressor so as to condense the refrigerant through the heat-exchange with the coolant and the refrigerant, a receiver-drier portion integrally formed at one end of the first heat-radiating portion so as to receive the condensed refrigerant from the first heat-radiating portion, and performing gas-liquid separation and moisture removal of the refrigerant, and a second heat-radiating portion integrally formed at a lower portion of the first heat-radiating portion between the first heat-radiating portion and the receiver-drier portion, circulating the gaseous refrigerant of low temperature/pressure supplied from the evaporator, and overcooling the gaseous refrigerant of low temperature/pressure through heat-exchange with the refrigerant passing through and supplied from the receiver-drier portion.

A first connecting line for supplying the condensed refrigerant to the receiver-drier portion may be formed at a lower portion of the first heat-radiating portion.

A second connecting line for receiving from the receiver-drier portion the refrigerant in which the gas-liquid separation and the moisture removal is performed may be formed at the second heat-radiating portion.

The second heat-radiating portion may be provided with a coolant line for flowing the refrigerant supplied from the receiver-drier portion through the second connecting line and a gaseous refrigerant line for flowing the gaseous refrigerant of low temperature/pressure supplied from the evaporator, wherein the refrigerant is overcooled through heat-exchange with the condensed refrigerant passing through the coolant line and the gaseous refrigerant passing through the gaseous refrigerant line.

A heat-isolating portion for preventing heat-exchange with the refrigerant passing through the first heat-radiating portion and the overcooled refrigerant passing through the second heat-radiating portion may be formed between the first heat-radiating portion and the second heat-radiating portion.

The heat-isolating portion may be adapted to receive nitrogen easily through a plurality of brazing holes formed along a length direction thereof between the first heat-radiating portion and the second heat-radiating portion in a case of welding.

The condenser may further include an upper cover and a lower cover mounted respectively on an upper surface and a lower surface of the first heat-radiating portion, the receiver-drier portion, and the second heat-radiating portion, wherein a coolant inlet for receiving the coolant and a coolant outlet for exhausting the coolant are formed respectively at one side and the other side of the upper cover, and a refrigerant inlet for receiving the refrigerant from the compressor is formed at the other side of the upper cover.

A refrigerant outlet connected to the expansion valve and a gaseous refrigerant inlet connected to the evaporator may be formed at the other side of the lower cover, and a gaseous refrigerant outlet connected to the compressor may be formed at one side of the lower cover.

A desiccant for removing moisture remaining in the refrigerant may be replaceably installed in the receiver-drier portion.

The condenser according to various aspects of the present invention may include a heat-radiating portion formed by stacking a plurality of plates, connected to the radiator so as to circulate the coolant, and circulating the refrigerant supplied from the compressor so as to condense the refrigerant through the heat-exchange with the coolant and the refrigerant, and a receiver-drier portion integrally formed at one end of the heat-radiating portion so as to receive the condensed refrigerant from the heat-radiating portion, and performing gas-liquid separation and moisture removal of the refrigerant.

A connecting line for supplying the condensed refrigerant to the receiver-drier portion may be formed at a lower portion of the heat-radiating portion.

The condenser may further include an upper cover and a lower cover mounted respectively on an upper surface and a lower surface of the heat-radiating portion and the receiver-drier portion, wherein a coolant inlet and a coolant outlet connected to the radiator are formed respectively at one side and the other side of the upper cover, and a refrigerant inlet connected to the compressor is formed at the other side of the upper cover.

A refrigerant outlet connected to the expansion valve may be formed at one side of the lower cover.

A desiccant for removing moisture remaining in the refrigerant may be replaceably installed in the receiver-drier portion.

The condenser according to various aspects of the present invention may include a first heat-radiating portion formed by stacking a plurality of plates, connected to the radiator so as to circulate the coolant, and circulating the refrigerant supplied from the compressor so as to condense the refrigerant through the heat-exchange with the coolant and the refrigerant, a second heat-radiating portion integrally formed at a lower portion of the first heat-radiating portion and condensing the refrigerant through the heat-exchange with the coolant and the refrigerant, and a receiver-drier portion integrally formed at one end of the first and second heat-radiating portions so as to receive the condensed refrigerant from the first heat-radiating portion, and performing gas-liquid separation and moisture removal of the refrigerant.

The condenser may further include an upper cover and a lower cover mounted respectively on an upper surface and a lower surface of the first and second heat-radiating portions and the receiver-drier portion, wherein a refrigerant inlet connected to the compressor and supplying the refrigerant to the first heat-radiating portion is formed at one side of the upper cover.

A refrigerant outlet connected to the expansion valve and a coolant inlet connected to the radiator may be formed at one side of the lower cover, and a coolant outlet connected to the radiator may be formed at the other side of the lower cover.

A desiccant for removing moisture remaining in the refrigerant may be replaceably installed in the receiver-drier portion.

The first heat-radiating portion may condense the refrigerant through heat-exchange with the coolant, and may supply the condensed refrigerant to the receiver-drier portion through a first connecting line formed at a lower portion thereof.

The second heat-radiating portion may be connected to the receiver-drier portion through a second connecting line, may receive the refrigerant in which gas-liquid separation and moisture removal are performed from the receiver-drier portion, and may heat-exchange the refrigerant with the coolant secondarily.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
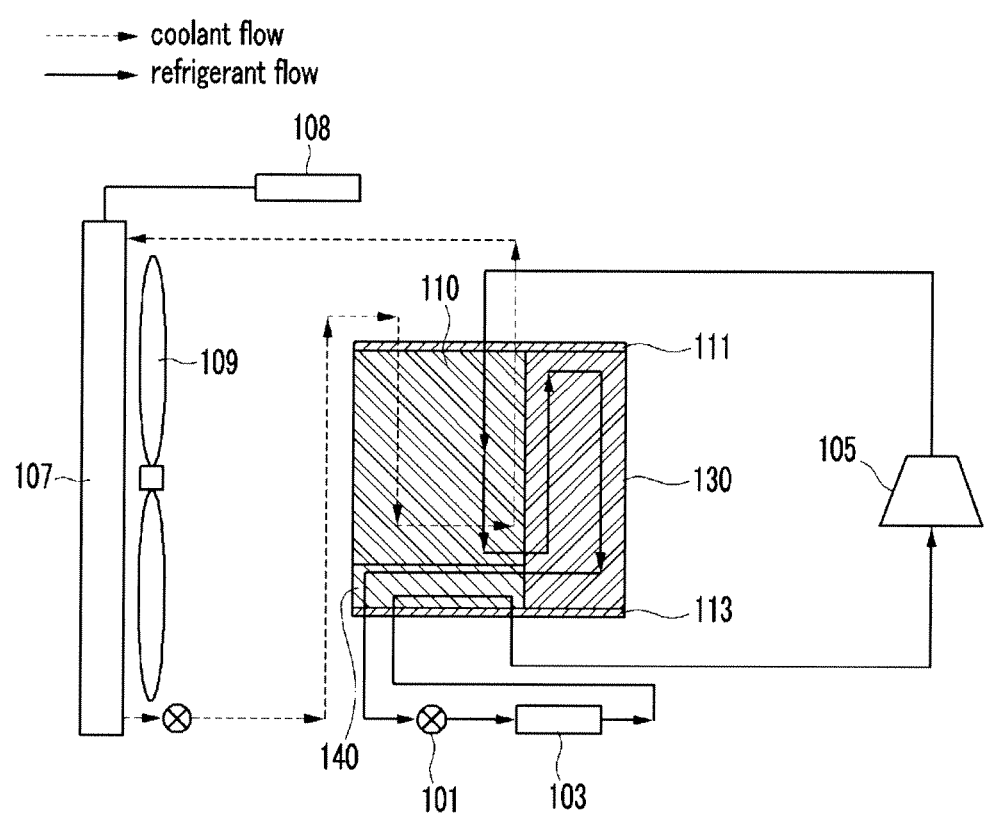
FIG. 1 is a schematic diagram of an exemplary air conditioning of a vehicle to which a condenser according to the present invention is applied.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIGS. 1-4, a condenser 100 for a vehicle according to various embodiments of the present invention is used in an air conditioning which includes an expansion valve 101 for expanding a liquid refrigerant, an evaporator 103 for evaporating the refrigerant expanded by the expansion valve 101 through heat-exchange with an air, and a compressor 105 for receiving from the evaporator 103 and compressing a gaseous refrigerant.

That is, the condenser 100 is provided between the compressor 105 and the expansion valve 101, and is configured to circulate a coolant supplied from a radiator 107 and to condense the refrigerant supplied from the compressor 105 through heat-exchange with the coolant.

The radiator 107 is connected to a reservoir tank 108, and a cooling fan 109 is provided at a rear portion of the radiator 107.

In the condenser 100 for the vehicle according to various embodiments of the present invention, a receiver-drier is integrally provided and a plurality of plates is stacked. The condenser 100 for vehicle condenses the refrigerant by using the coolant, and overcools the condensed refrigerant through heat-exchange with the gaseous refrigerant of low temperature/pressure supplied from the evaporator 103. Since additional devices for overcooling the condensed refrigerant can be removed, the number of components may be reduced and connections therebetween may be simplified. Thus, cost and weight may be reduced. In addition, since dead volume of the receiver-drier can be minimized and heat-radiating area may be increased, cooling efficiency may be improved according to the condenser 100 for the vehicle.

Figure 2:
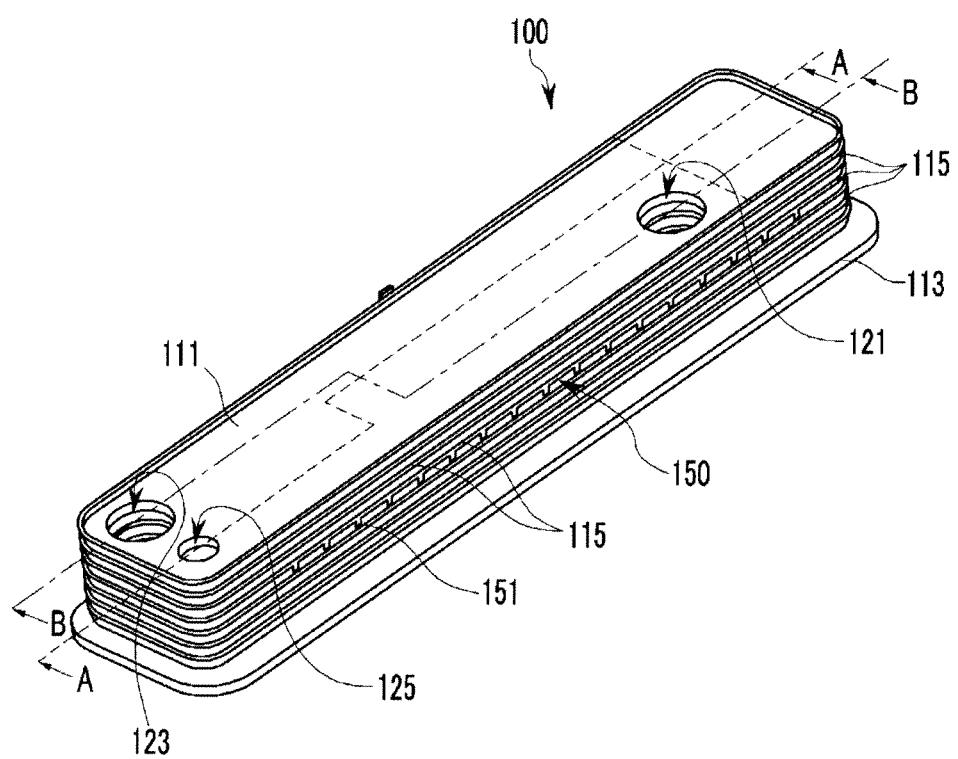
FIG. 2 is a perspective view of an exemplary condenser for a vehicle according to the present invention.

For these purposes, the condenser 100 for the vehicle according to various embodiments of the present invention, such as that as shown in FIG. 1 and FIG. 2, includes a first heat-radiating portion 110, a receiver-drier portion 130, and a second heat-radiating portion 140, and each component will be described in detail.

The first heat-radiating portion 110 includes an upper cover 111 and a lower cover 113, and a plurality of plates 115 is stacked between the upper cover 111 and the lower cover 113.

The first heat-radiating portion 110 is connected to the radiator 107 so as to circulate the coolant, and circulates the refrigerant supplied from the compressor 105 so as to condense the refrigerant through heat-exchange with the coolant.

At this time, the first heat-radiating portion 110 performs heat-exchange by means of counterflow of the coolant and the refrigerant.

Figure 3:
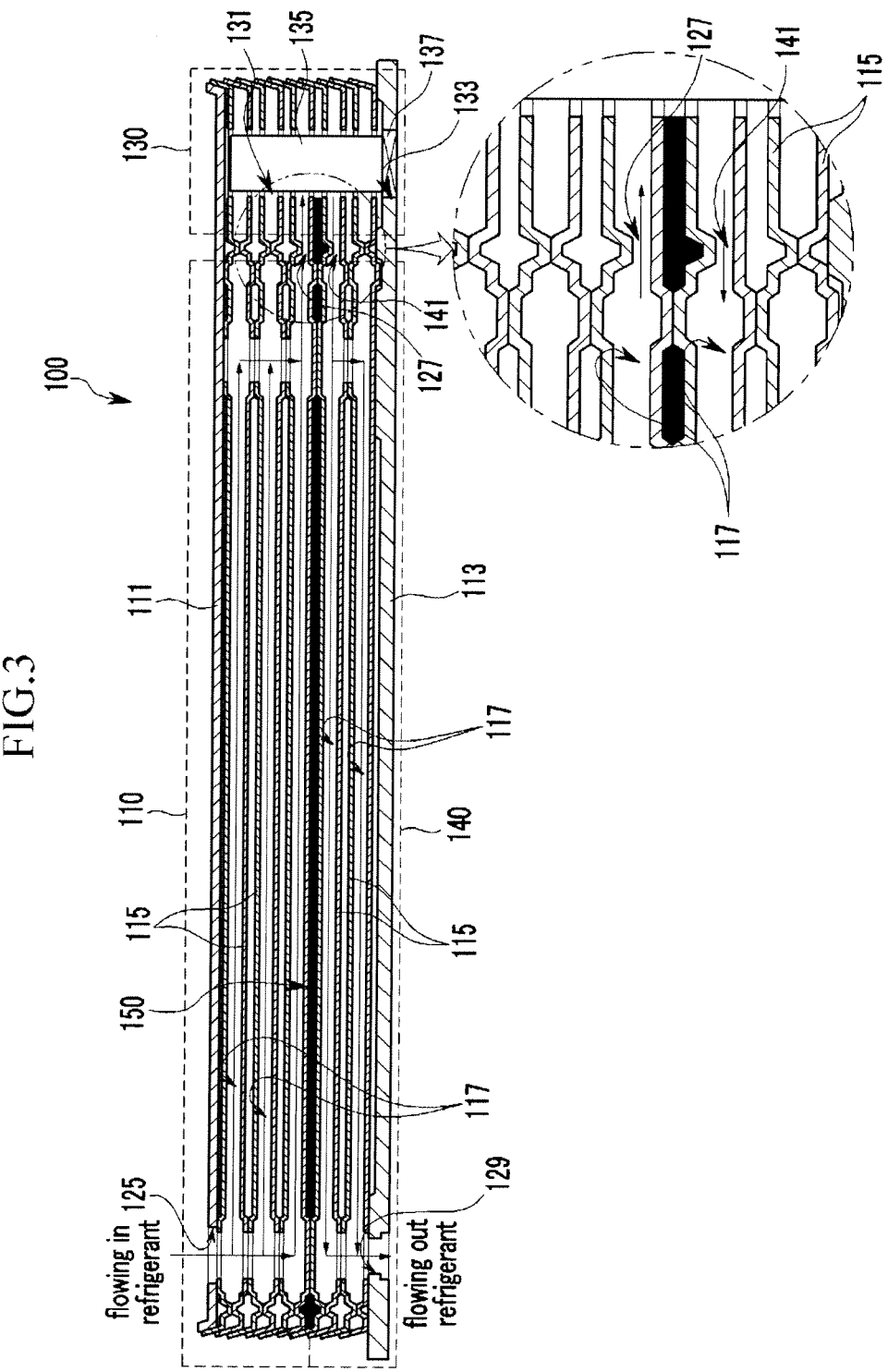
FIG. 3 is a cross-sectional view taken along a line A-A in FIG. 2.
Figure 4:
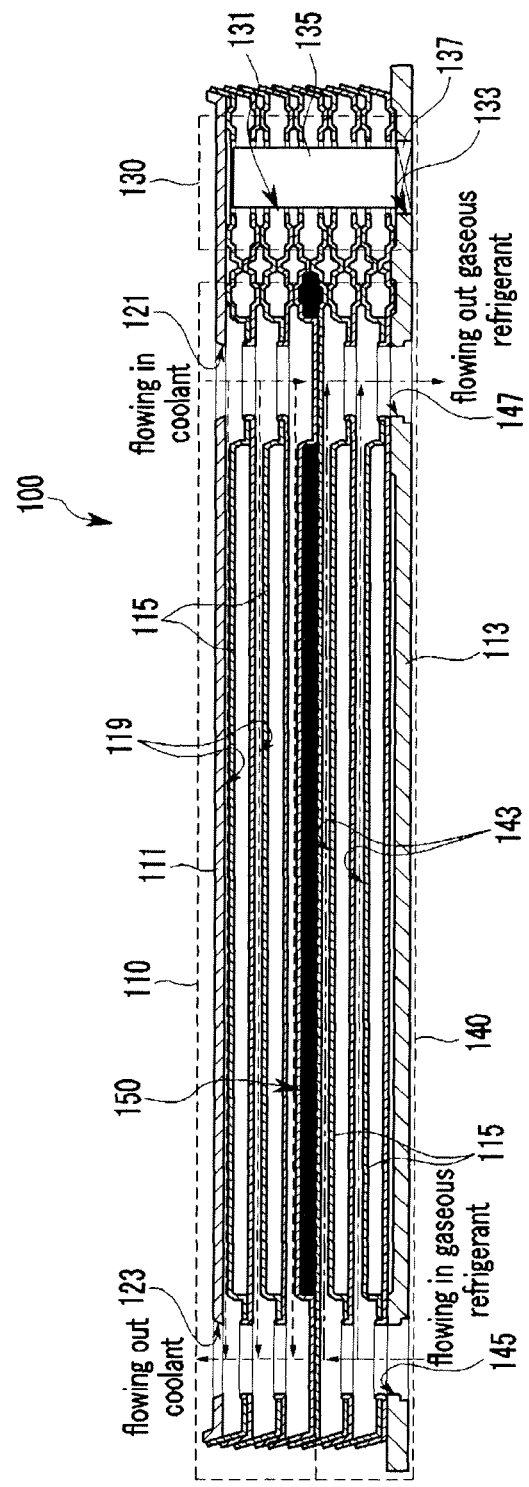
FIG. 4 is a cross-sectional view taken along a line B-B in FIG. 2.

That is, the plurality of plates 115 is stacked in the first heat-radiating portion 110, and refrigerant lines 117 and coolant lines 119 are alternately formed between the plurality of plates 115. Since the refrigerant passes through the refrigerant line 117 and the coolant passes through the coolant line 119, the refrigerant and the coolant are not mixed to each other and flow to opposite direction as shown in FIG. 3 and FIG. 4. At this process, heat-exchange of the refrigerant and the coolant occurs.

A coolant inlet 121 for receiving the coolant from the radiator 107 and a coolant outlet 123 for flowing out the coolant to the radiator 107 are formed respectively at one side and the other side of the upper cover 111 corresponding to the first heat-radiating portion 110.

In addition, a refrigerant inlet 125 for receiving the refrigerant of high temperature/pressure from the compressor 105 is formed at the other side of the upper cover 111 at which the coolant outlet 123 is formed.

Since the refrigerant inlet 125 is formed at an opposite side of the coolant inlet 121 and at the same side of the coolant outlet 123, counterflow of the refrigerant and the coolant is achieved.

The receiver-drier portion 130 receives the condensed refrigerant from the first heat-radiating portion 110 and performs gas-liquid separation and moisture removal of the condensed refrigerant. The receiver-drier portion 130 is integrally formed at one end of the first heat-radiating portion 110 and is connected to the first heat-radiating portion 110.

In this case, the first heat-radiating portion 110 is provided with a first connecting line 127 at a lower portion thereof so as to supply the cooled and condensed refrigerant through heat-exchange with the coolant to the receiver-drier portion 130.

Since the receiver-drier portion 130 uses a receiver-drier having the same shape as the condenser 100, dead volume thereof may be minimized and additional connecting pipes may be removed, compared with a conventional receiver-drier of cylindrical shape.

Meanwhile, a space 131 is formed in the receiver-drier portion 130, and an insertion hole 133 is formed at the lower cover 113 corresponding to the space 131.

A desiccant 135 is inserted in the space 131 through the insertion hole 133 and removes moisture in the condensed refrigerant supplied from the first heat-radiating portion 110.

The desiccant 135 can be replaced through the insertion hole 133 according to replacement period. That is, the desiccant 135 is replaceably mounted in the receiver-drier portion 130.

Meanwhile, a filter is integrally formed with the desiccant 135, and the filter removes foreign materials contained in the refrigerant supplied to the receiver-drier portion 130.

That is, the receiver-drier portion 130 removes the moisture remaining in the refrigerant by the desiccant 135 and filters the foreign materials contained in the refrigerant by the filter. Therefore, it is prevented for the foreign materials remaining in the refrigerant from flowing into the expansion valve 101.

Accordingly, it is prevented for the foreign materials remaining in the refrigerant from blocking the expansion valve 101.

A fixing cap 137 for preventing escape of the desiccant 135 inserted in the space 131 and for preventing leakage of the refrigerant supplied to the receiver-drier portion 130 is mounted at the insertion hole 133.

In addition, the second heat-radiating portion 140 is integrally formed at a lower portion of the first heat-radiating portion 110 between the first heat-radiating portion 110 and the receiver-drier portion 130.

The second heat-radiating portion 140 circulates gaseous refrigerant of low temperature/pressure supplied from the evaporator 103, and thereby overcools the refrigerant supplied from the receiver-drier portion 130 through heat-exchange with the gaseous refrigerant of low temperature/pressure.

At this time, the second heat-radiating portion 140 performs heat-exchange by means of counterflow of the gaseous refrigerant of low temperature/pressure and the refrigerant supplied from the receiver-drier portion 130.

A second connecting line 141 is formed at an upper portion of the second heat-radiating portion 140 so as to receive the refrigerant in which gas-liquid separation and moisture removal is performed from the receiver-drier portion 130.

The second heat-radiating portion 140 includes the refrigerant line 117 through which the refrigerant supplied from the receiver-drier portion 130 through the second connecting line 141 flows, and a gaseous refrigerant line 143 through which the gaseous refrigerant of low temperature/pressure supplied from the evaporator 103 flows. Therefore, the condensed refrigerant passing through the refrigerant line 117 and the gaseous refrigerant of low temperature/pressure passing through the gaseous refrigerant line 143 are heat-exchanged with each other.

That is, the plurality of plates 115 are stacked with a distance in the second heat-radiating portion 140, and the refrigerant line 117 and the gaseous refrigerant line 143 are alternately formed between the a plurality of plates 115. Since the refrigerant passes through the refrigerant line 117 and the gaseous refrigerant passes through the gaseous refrigerant line 143, the condensed refrigerant supplied from the receiver-drier portion 130 and the gaseous refrigerant of low temperature/pressure are not mixed to each other and flow to opposite direction as shown in FIG. 3 and FIG. 4. At this process, heat-exchange of the refrigerant and the gaseous refrigerant occurs.

A coolant outlet 129 is formed at the lower cover 113 on an opposite side of the receiver-drier portion 130 corresponding to the refrigerant inlet 125, and the coolant outlet 129 is connected to the expansion valve 101.

In addition, a gaseous refrigerant inlet 145 and a gaseous refrigerant outlet 147 disposed at both sides of the second heat-radiating portion 140 are formed at the lower cover 113. The gaseous refrigerant inlet 145 and the coolant outlet 129 are disposed at the same side and are connected to the evaporator 103. In addition, the gaseous refrigerant outlet 147 is disposed at an opposite side of the coolant outlet 129 and is connected to the compressor 105.

Meanwhile, the receiver-drier portion 140 is integrally formed at one side of the first heat-radiating portion 110 and the second heat-radiating portion 140, and is not communicated with the first and the second heat-radiating portions 110 and 140 except the first and second connecting lines 127 and 141.

A heat-isolating portion 150 for preventing heat-exchange of the refrigerant passing through the first heat-radiating portion 110 and the overcooled refrigerant passing through the second heat-radiating portion 140 is formed between the first heat-radiating portion 110 and the second heat-radiating portion 140.

The heat-isolating portion 150 is adapted to receive nitrogen therein easily through a plurality of brazing holes 151 formed when stacking the plurality of plates 115 in a case of welding.

The brazing holes 151 are formed in order to reduce welding inferiority rate by exhausting gas occurring when the plurality of plates 115 are stacked and to easily insert the nitrogen into the heat-isolating portion 150.

The brazing holes 151 are closed after the nitrogen for forming the heat-isolating portion 150 is inserted.

As mentioned above, a condenser 100 according to various embodiments of the present invention includes heat exchanger in which a plurality of plates 115 is stacked.

That is, the condenser 100 for the vehicle according to various embodiments of the present invention includes the first heat-radiating portion 110 receiving the coolant cooled by the radiator 107 through the coolant inlet 121.

The coolant circulates through the coolant line 119 formed between the plurality of plates 115 in the first heat-radiating portion 110. After that, the coolant flows out from the condenser 100 through the coolant outlet 123 and is supplied back to the radiator 107.

At this time, the refrigerant flows from the compressor 105 into the first heat-radiating portion 110 through the refrigerant inlet 125, and flows through the refrigerant line 117 alternately formed with the coolant line 119.

Accordingly, the coolant and the refrigerant flowing in the first heat-radiating portion 110 flow to opposite direction and are heat-exchanged with each other. If the heat-exchange of the coolant and the refrigerant is completed, the cooled and condensed refrigerant is supplied to the receiver-drier portion 130 through the first connecting line 127.

The condensed refrigerant circulates in the receiver-drier portion 130. At this time, gas-liquid separation is performed and the moisture in the refrigerant is removed by the desiccant 135. After that, the condensed refrigerant is supplied to the second heat-radiating portion 140 through the second connecting line 141.

The refrigerant supplied to the second heat-radiating portion 140 circulates through the refrigerant line 117 in the second heat-radiating portion 140.

At this time, the gaseous refrigerant of low temperature/pressure is supplied from the evaporator 103 to the second heat-radiating portion 140 through the gaseous refrigerant inlet 145.

The gaseous refrigerant flowing in the second heat-radiating portion 140 flows through the gaseous refrigerant line 143 to opposite direction of the refrigerant passing through the refrigerant line 117.

Accordingly, the gaseous refrigerant heat-exchanges with the refrigerant passing through the first heat-radiating portion 140 and the receiver-drier portion 130 and overcools the refrigerant.

That is, the refrigerant flowing in the second heat-radiating portion 140 flows to an opposite direction of the gaseous refrigerant and is overcooled through heat-exchange with the gaseous refrigerant. After that, the refrigerant flows out through the coolant outlet 129 and is supplied to the expansion valve 101.

Meanwhile, the gaseous refrigerant flowing in through the gaseous refrigerant inlet 145 heat-exchanges with the refrigerant in the second heat-radiating portion 140, and flows out through the gaseous refrigerant outlet 147. The gaseous refrigerant is supplied to the compressor 105 connected to the gaseous refrigerant outlet 147.

Since the receiver-drier portion 130 is integrally formed with the first and second heat-radiating portions 110 and 120, additional connection pipes for connecting the receiver-drier portion 130 to the first and second heat-radiating portions 110 and 120 can be removed. In addition, since receiver-drier of the receiver-drier portion 130 has the same shape as the condenser 100, dead volume can be minimized.

In addition, the heat-isolating portion 150 prevents heat-exchange between the first heat-radiating portion 110 and the second heat-radiating portion 140. Therefore, condensing efficiency and cooling efficiency of the condenser 100 may be improved.

Meanwhile, the plurality of plates 115 without the upper and lower covers 111 and 113 can form the first and second heat-radiating portions 110 and 140 and the receiver-drier portion 130 according to various embodiments of the present invention.

Hereinafter, with reference to FIGS. 5-8, a condenser 200 for the vehicle according to other various embodiments of the present invention will be described in detail. The condenser 200 for the vehicle according to illustrated embodiment of the present invention is similar to that described above. Therefore, differences between the exemplary illustrated embodiments will be mainly discussed.

Referring to the drawings, the condenser 200 for the vehicle according to various embodiments of the present invention is used in the air conditioning which includes the expansion valve 201 for expanding liquid refrigerant, the evaporator 203 for evaporating the refrigerant expanded by the expansion valve 201 through heat-exchange with the air, and the compressor 205 for receiving from the evaporator 203 and compressing the gaseous refrigerant.

That is, the condenser 200 is provided between the compressor 205 and the expansion valve 201, and is configured to circulate the coolant supplied from the radiator 207 and to condense the refrigerant supplied from the compressor 205 through heat-exchange with the coolant.

The radiator 207 is connected to the reservoir tank 208, and the cooling fan 209 is provided at a rear portion of the radiator 207.

Figure 5:
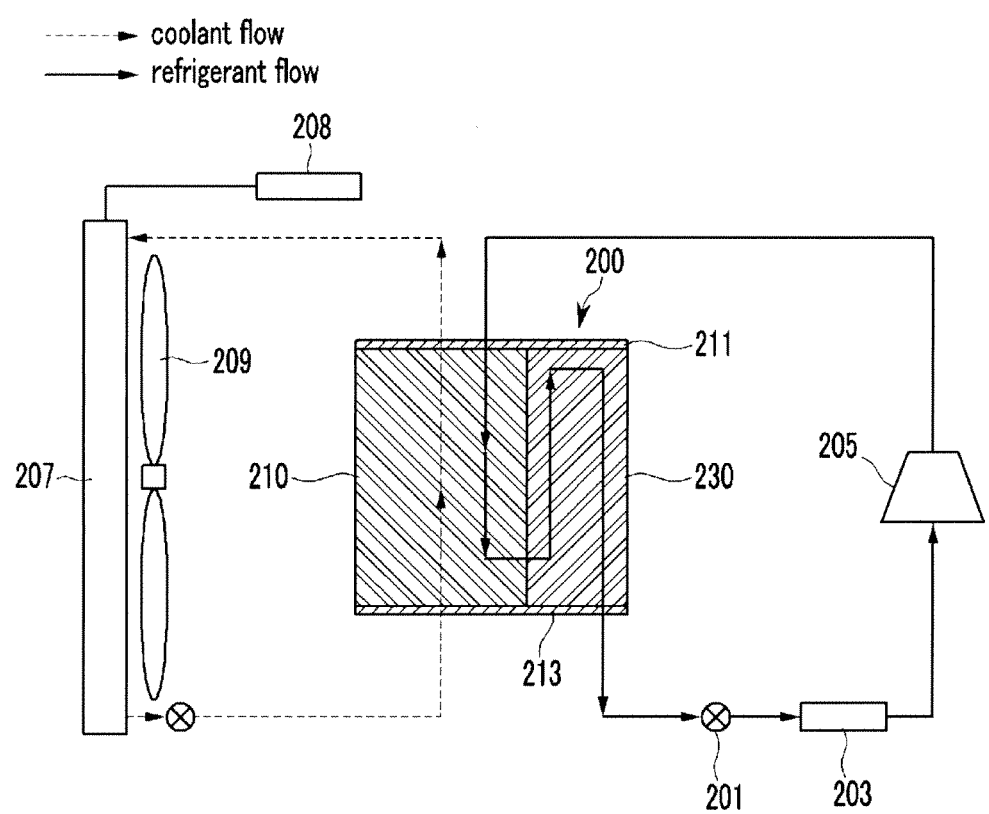
FIG. 5 is a schematic diagram of an exemplary air conditioning of a vehicle to which a condenser according to the present invention is applied.
Figure 6:
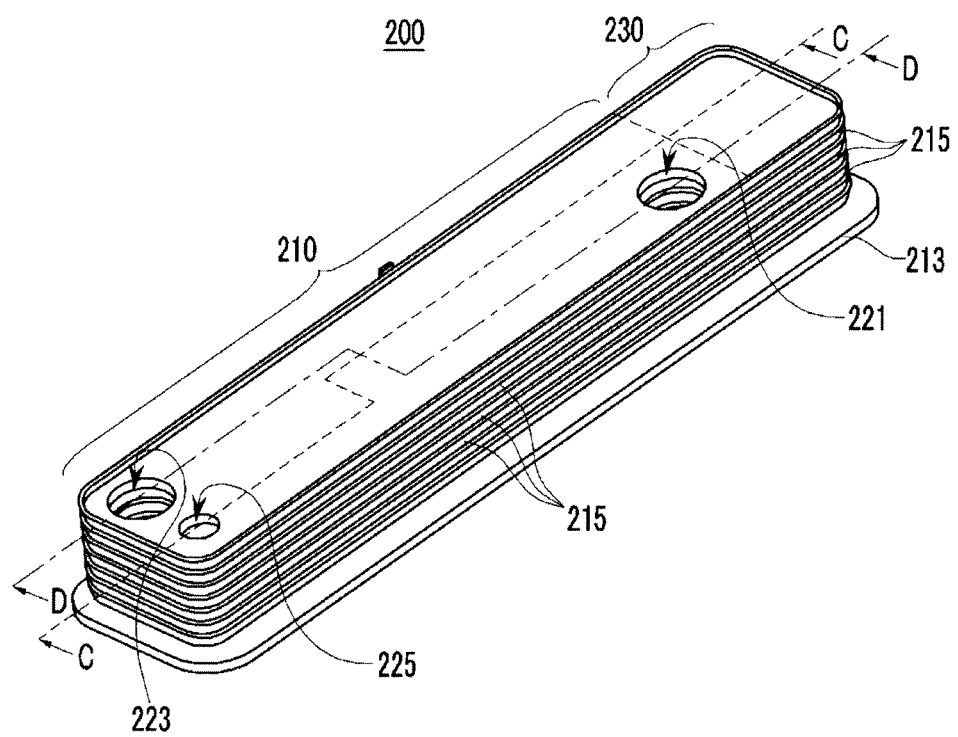
FIG. 6 is a perspective view of an exemplary condenser for a vehicle according to the present invention.

The condenser 200 for the vehicle according to various embodiments of the present invention, as shown in FIG. 5 to FIG. 6, includes a heat-radiating portion 210 and a receiver-drier portion 230.

Figure 7:
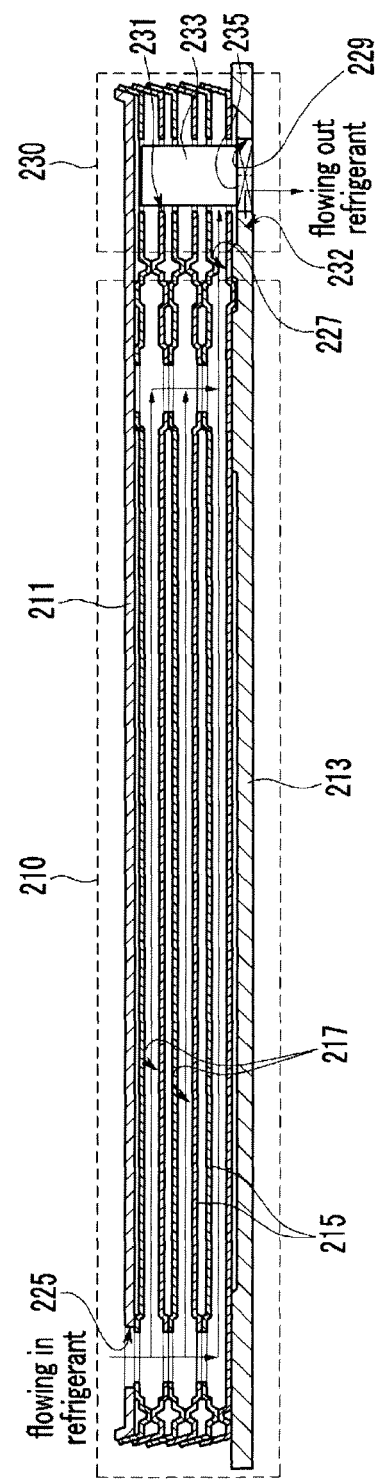
FIG. 7 is a cross-sectional view taken along a line C-C in FIG. 6.
Figure 8:
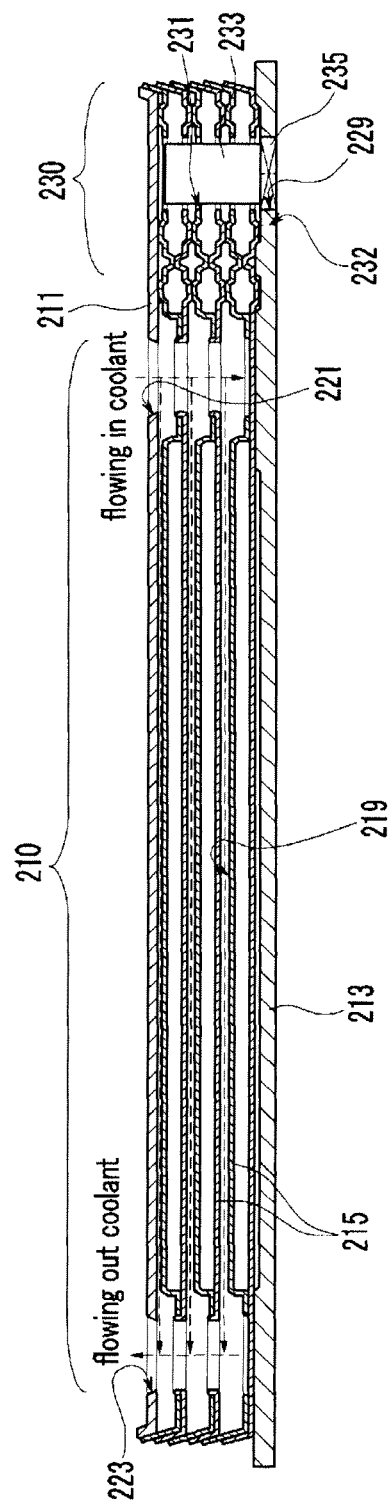
FIG. 8 is a cross-sectional view taken along a line D-D in FIG. 6.

The heat-radiating portion 210, as shown in FIG. 7 and FIG. 8, includes the upper cover 211 and the lower cover 213, and the plurality of plates 215 is stacked between the upper cover 211 and the lower cover 213.

The heat-radiating portion 210 is connected to the radiator 207 so as to circulate the coolant, and circulates the refrigerant supplied from the compressor 205 so as to condense the refrigerant through heat-exchange with the coolant.

At this time, the heat-radiating portion 210 performs heat-exchange by means of counterflow of the coolant and the refrigerant.

That is, the plurality of plates 215 is stacked with a distance in the heat-radiating portion 210, and the refrigerant lines 217 and the coolant lines 219 are alternately formed between the plurality of plates 215. Therefore, the refrigerant and the coolant are not mixed and flow to opposite direction as shown in FIG. 7 and FIG. 8. At this process, heat-exchange of the refrigerant and the coolant occurs.

The coolant inlet 221 and the coolant outlet 223 connected to the radiator 207 and the refrigerant inlet 225 connected to the compressor 205 are formed respectively at one side and the other side of the upper cover 211 corresponding to the heat-radiating portion 210.

The receiver-drier portion 230 receives the condensed refrigerant from the heat-radiating portion 210 and performs gas-liquid separation and moisture removal of the condensed refrigerant. The receiver-drier portion 230 is integrally formed at one end of the heat-radiating portion 210 and is connected to the heat-radiating portion 210.

In this case, the heat-radiating portion 210 is provided with a connecting line 227 at a lower portion thereof so as to supply the condensed refrigerant to the receiver-drier portion 230.

The refrigerant outlet 229 connected to the expansion valve 201 and the insertion hole 232 disposed apart from the refrigerant outlet 229 are formed at the lower cover 213.

The space 231 connected to the insertion hole 232 is formed in the receiver-drier portion 230.

The desiccant 233 is inserted in the space 231 and removes moisture remaining in the condensed refrigerant.

Meanwhile, the filter is integrally formed with the desiccant 233, and the filter removes foreign materials contained in the refrigerant supplied to the receiver-drier portion 230.

The fixing cap 235 preventing escape of the desiccant 233 inserted in the space 231 is mounted at the insertion hole 232.

The refrigerant which is condensed by the heat-radiating portion 210 and in which gas-liquid separation and moisture removal are performed by the receiver-drier portion 230 is smoothly supplied to the expansion valve 201 through the refrigerant outlet 229.

As mentioned above, the coolant cooled by the radiator 207 flows in the heat-radiating portion 210 through the coolant inlet 221 and circulates through the coolant lines 219 formed between the plates 215.

At this time, the refrigerant flows from the compressor 205 in the heat-radiating portion 210 through the refrigerant inlet 225, and circulates through the refrigerant line 217 formed alternately with the coolant line 219.

The coolant and the refrigerant flow to opposite direction in the heat-radiating portion 210 and are heat-exchanged with each other. If heat-exchange of the coolant and the refrigerant is completed, the cooled and condensed refrigerant flows in the receiver-drier portion 230 through the connecting line 227.

The condensed refrigerant circulates in the receiver-drier portion 230. At this time, gas-liquid separation is performed and the moisture in the refrigerant is removed by the desiccant 233. After that, the refrigerant flows out from the receiver-drier portion 230 through the refrigerant outlet 229 and is supplied to the expansion valve 201.

Since the receiver-drier portion 230 is integrally formed with the heat-radiating portion 210, additional connection pipes for connecting the receiver-drier portion 230 to the heat-radiating portion 210 can be removed. In addition, since the receiver-drier of the receiver-drier portion 230 has the same shape as the condenser 200, dead volume may be minimized.

Meanwhile, the plurality of plates 215 without the upper and lower covers 211 and 213 can form the heat-radiating portion 210 and the receiver-drier portion 230 according to various embodiments of the present invention.

According to various embodiments of the present invention, the receiver-drier is integrally formed with the water-cooled condenser. Therefore, the number of components may be reduced and connections therebetween may be simplified. In addition, cost and weight may be reduced.

Hereinafter, with reference to FIGS. 9-12, a condenser 300 for the vehicle according to various other embodiments of the present invention will be described in detail. The condenser 300 for the vehicle according to the illustrated embodiment of the present invention is similar to that described above. Therefore, differences between the exemplary illustrated embodiments will be mainly discussed.

Figure 9:
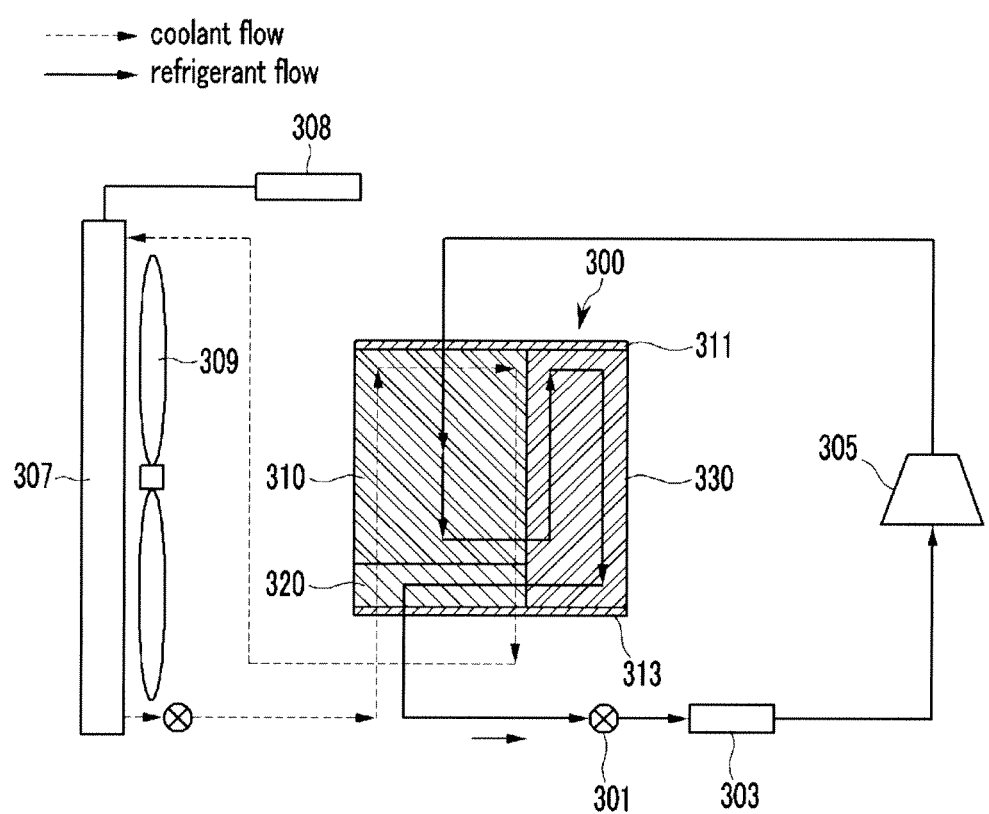
FIG. 9 is a schematic diagram of another air conditioning system of a vehicle to which a condenser according to the present invention is applied.

The condenser 300 for the vehicle according to various embodiments of the present invention, as shown in FIG. 9, is used in the air conditioning which includes the expansion valve 301 for expanding the liquid refrigerant, the evaporator 303 for evaporating the refrigerant expanded by the expansion valve 301 through heat-exchange with the air, and the compressor 305 for receiving from the evaporator 303 and compressing the gaseous refrigerant.

That is, the condenser 300 is provided between the compressor 305 and the expansion valve 301, and is configured to circulate coolant supplied from the radiator 307 and to condense the refrigerant supplied from the compressor 305 through heat-exchange with the coolant.

The radiator 307 is connected to the reservoir tank 308, and the cooling fan 309 is provided at a rear portion of the radiator 307.

In the condenser 300 for the vehicle according to various embodiments of the present invention, the receiver-drier is integrally provided and the plurality of plates is stacked. Since the condenser 300 for the vehicle condenses the refrigerant by using the coolant, the number of components may be reduced and connections therebetween may be simplified. Thus, cost and weight may be reduced. In addition, since dead volume of the drier can be minimized and heat-radiating area may be increased, cooling efficiency may be improved.

Figure 10:
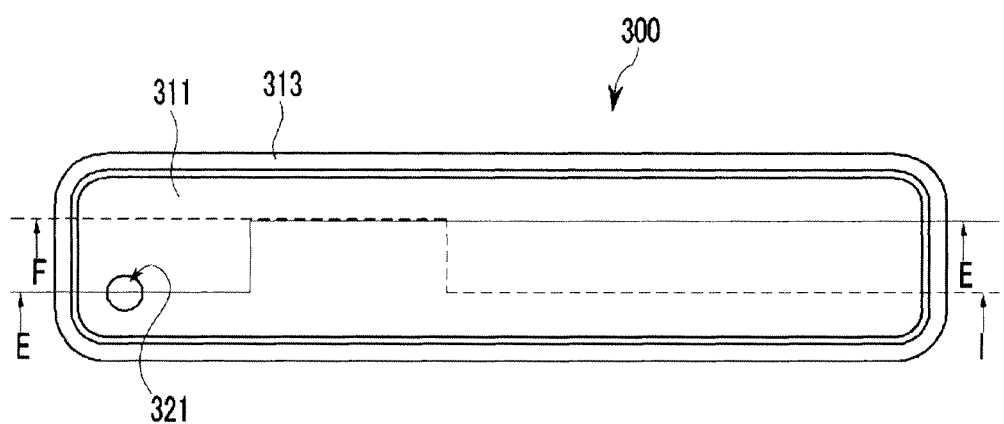
FIG. 10 is a perspective view of exemplary condenser for a vehicle according to the present invention.
Figure 11:
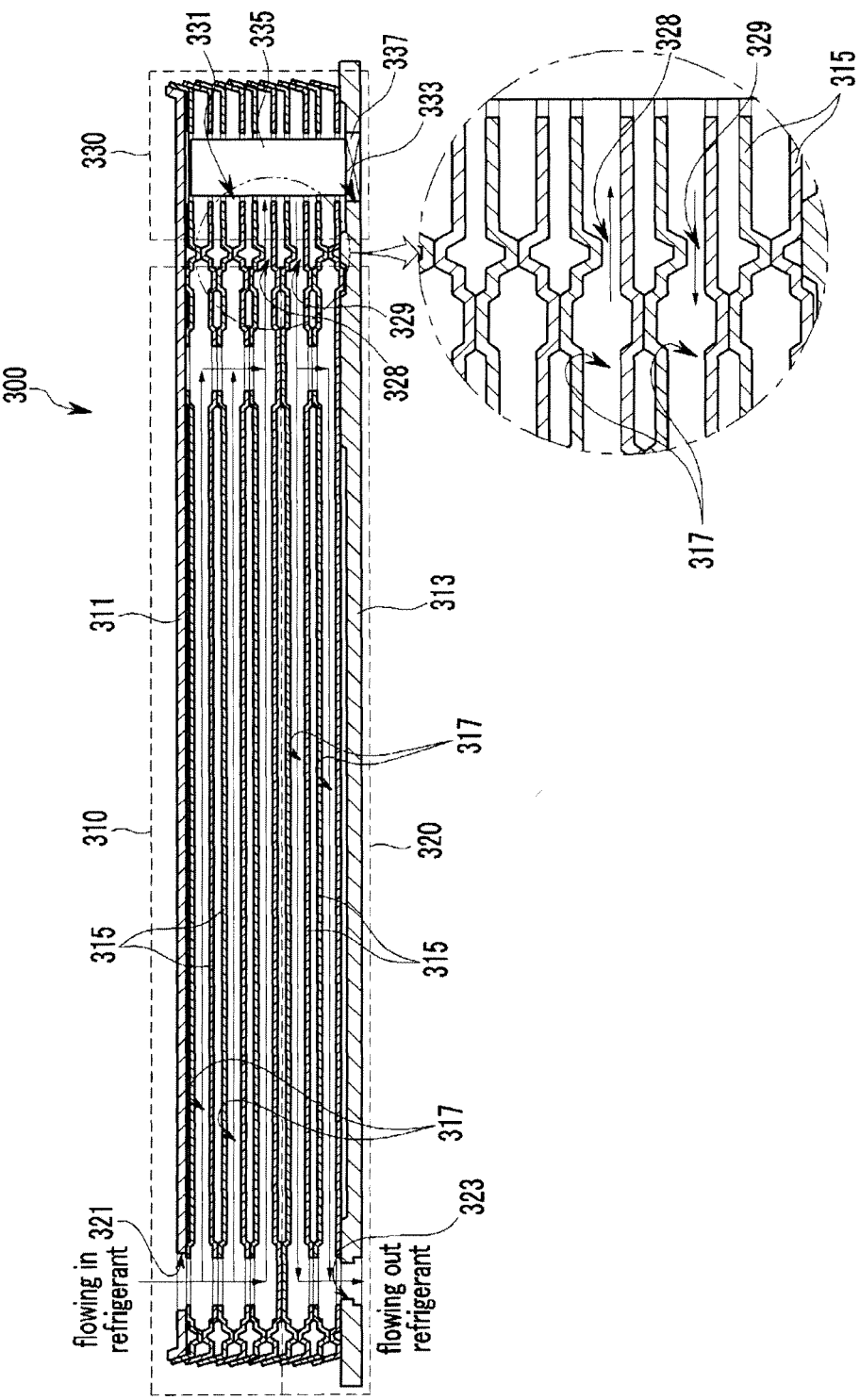
FIG. 11 is a cross-sectional view taken along a line E-E in FIG. 10.
Figure 12:
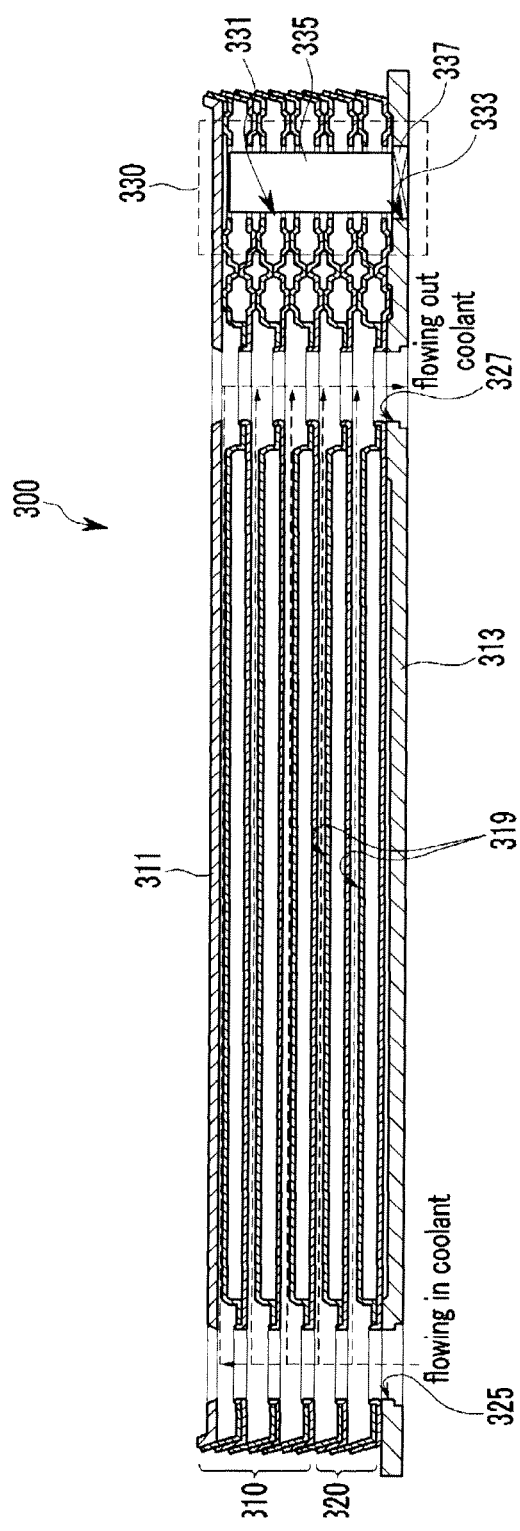
FIG. 12 is a cross-sectional view taken along a line F-F in FIG. 10.

The condenser 300 for the vehicle according to various embodiments of the present invention, as shown in FIG. 10 to FIG. 12, includes the first heat-radiating portion 310, the second heat-radiating portion 320, and the receiver-drier portion 340.

The first heat-radiating portion 310 includes the upper cover 311 and the lower cover 313, and the plurality of plates 315 is stacked between the upper cover 311 and the lower cover 313.

The first heat-radiating portion 310 is connected to the radiator 307 so as to circulate the coolant, and circulates the refrigerant supplied from the compressor 305 so as to condense the refrigerant through heat-exchange with the coolant.

In addition, the second heat-radiating portion 320 is formed at a lower portion of the first heat-radiating portion 310 between the upper and lower covers 311 and 313.

The second heat-radiating portion 320 secondarily cools the condensed refrigerant cooled by the first heat-radiating portion 310.

The first and second heat-radiating portions 310 and 320 perform heat-exchange by means of counterflow of the coolant and the refrigerant.

The plurality of plates 315 is stacked with a distance in the first and second heat-radiating portions 310 and 311, and the refrigerant lines 317 and the coolant lines 319 are alternately formed between the plurality of plates 315. Therefore, the refrigerant flowing through the refrigerant line 317 and the coolant flowing through the coolant line 319 are not mixed to each other, and flow to opposite direction as shown in FIG. 11 and FIG. 12. At this process, heat-exchange of the refrigerant and the coolant occurs.

The refrigerant inlet 321 which is connected to the compressor 305 and supplying the refrigerant to the first heat-radiating portion 310 is formed at the upper cover 311.

In addition, the refrigerant outlet 323 connected to the expansion valve 301 is formed at the lower cover 313.

In addition, the coolant inlet 325 and the coolant outlet 327 connected respectively to both sides of the radiator 307 are formed at the lower cover 313.

That is, since the coolant of low temperature firstly flows in the second heat-radiating portion 320 through the coolant inlet 325 of the lower cover 313, the refrigerant flowing out from the first heat-radiating portion 310 is additionally cooled. Therefore, cooling efficiency may be improved.

In addition, the receiver-drier portion 330 receives the condensed refrigerant from the first heat-radiating portion 310 and performs gas-liquid separation and moisture removal of the refrigerant. The receiver-drier portion 330 is integrally formed at one end of the first and second heat-radiating portions 310 and 320 and is connected to the first and second heat-radiating portions 310 and 320.

The first heat-radiating portion 310 condenses the refrigerant through heat-exchange with the coolant and supplies the condensed refrigerant through the first connecting line 328 formed at a lower portion thereof to the receiver-drier portion 330.

In addition, the second heat-radiating portion 320 is connected to the receiver-drier portion 330 through the second connecting line 329 formed at an upper portion thereof. The second heat-radiating portion 320 receives the refrigerant in which gas-liquid separation and moisture removal is performed from the receiver-drier portion 330 and additionally cools the refrigerant through secondary heat-exchange with the coolant of low temperature flowing into the second heat-radiating portion.

Since the receiver-drier portion 330 uses a receiver-drier having the same shape as the condenser 300, dead volume thereof may be minimized and additional connecting pipes may be removed, compared with a conventional receiver-drier of cylindrical shape.

In addition, the receiver-drier portion 330 is integrally formed at one end of the first and second heat-radiating portions 310 and 320, and is connected to the first and second heat-radiating portions 310 and 320 respectively through the first and second connecting lines 328 and 329.

The space 331 is formed in the receiver-drier portion 330, and the insertion hole 333 is formed at the lower cover 313 corresponding to the space 331.

The desiccant 335 is inserted in the space 331 through the insertion hole 333 and removes moisture in the condensed refrigerant.

In addition, the filter is integrally formed with the desiccant 335 and removes foreign materials contained in the refrigerant supplied to the receiver-drier portion 330. The refrigerant from which the foreign materials are filtered is secondarily cooled at the second heat-radiating portion 320, and flows to the expansion valve 301 through the refrigerant outlet 323.

The fixing cap 337 for preventing escape of the desiccant 335 inserted in the space 331 and for preventing leakage of the refrigerant supplied to the receiver-drier portion 330 is mounted at the insertion hole 333.

According to various embodiments of the present invention, the coolant cooled by the radiator 307 flows in the second heat-radiating portion 320 through the coolant inlet 325. The coolant flows to the first heat-radiating portion 310 passing through the coolant lines 319 formed between the plurality of plates 315. After that, the coolant flows out through the coolant outlet 327.

At this time, the refrigerant is supplied from the compressor 305 to the first heat-radiating portion 310 through the refrigerant inlet 321 and flows through the refrigerant lines 317 formed alternately with the coolant lines 319.

The refrigerant and the coolant flowing in the first heat-radiating portion 310 flow to opposite direction and are heat-exchanged with each other. If heat-exchange of the coolant and the refrigerant is completed, the cooled and condensed refrigerant flows to the receiver-drier portion 330 through the first connecting line 328.

The refrigerant circulated in the receiver-drier portion 330. At this time, gas-liquid separation is performed and the moisture in the refrigerant is removed by the desiccant 333.

After that, the refrigerant is supplied to the second heat-radiating portion 320 through the second connecting line 329.

The refrigerant supplied to the second heat-radiating portion 320 flows to opposite direction of the coolant of low temperature flowing firstly in the second heat-radiating portion 320 and is additionally cooled through second heat-exchange with the coolant. After that, the coolant flows out through the refrigerant outlet 323 and is supplied to the expansion valve 301.

Since the receiver-drier portion 330 is integrally formed with the first and second heat-radiating portions 310 and 320, additional connection pipes for connecting the receiver-drier portion 330 to the first and second heat-radiating portions 310 and 320 can be removed. In addition, since receiver-drier of the receiver-drier portion 330 has the same shape as the condenser 300, dead volume can be minimized.

Meanwhile, the plurality of plates 315 without the upper and lower covers 311 and 313 can form the first and second heat-radiating portions 310 and 320 and the receiver-drier portion 330 according to various embodiments of the present invention.

According to various embodiments of the present invention, the receiver-drier is integrally formed with the water-cooled condenser. Therefore, the number of components may be reduced and connections therebetween may be simplified. In addition, cost and weight may be reduced.

For convenience in explanation and accurate definition in the appended claims, the terms upper or lower, rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A condenser for a vehicle which is used in an air conditioning system having an expansion valve expanding liquid refrigerant, an evaporator evaporating the liquid refrigerant expanded at the expansion valve through heat-exchange with air to change the liquid refrigerant into gaseous refrigerant, and a compressor receiving from the evaporator and compressing the gaseous refrigerant, wherein the condenser is provided between the compressor and the expansion valve, and wherein the condenser circulates coolant supplied from a radiator to condense the compressed refrigerant supplied from the compressor through heat-exchange with the coolant, the condenser comprising:

a first heat-radiating portion formed by stacking a plurality of first plates, connected to the radiator to circulate the coolant, and circulating the refrigerant supplied from the compressor to condense the compressed refrigerant through heat-exchange with the coolant, wherein each of the first plates have an opening;

a second heat-radiating portion integrally formed at a lower portion of the first heat-radiating portion formed by stacking a plurality of second plates, and circulating the gaseous refrigerant of low temperature/pressure supplied from the evaporator, wherein each of the second plates have an opening; and a receiver-drier portion, wherein the openings of the first and second plates are aligned to form a space containing the receiver-drier portion, wherein the receiver-drier portion receives the condensed refrigerant from the first heat-radiating portion, performing gas-liquid separation and moisture removal of the compressed refrigerant, wherein the receiver-drier portion sends the refrigerant in which the gas-liquid separation and the moisture removal is performed to the second heat-radiating portion, and wherein the second heat-radiating portion overcools the refrigerant passing through and supplied from the receiver-drier portion through heat exchange with the gaseous refrigerant of low temperature/pressure supplied from the evaporator.

2. The condenser of claim 1, wherein a first connecting line for supplying the condensed refrigerant to the receiver-drier portion is formed at a lower portion of the first heat-radiating portion.

3. The condenser of claim 1, wherein a second connecting line for receiving from the receiver-drier portion the refrigerant in which the gas-liquid separation and the moisture removal is performed is formed at the second heat-radiating portion.

4. The condenser of claim 3, wherein the second heat-radiating portion is provided with a refrigerant line for flowing the refrigerant supplied from the receiver-drier portion through the second connecting line and a gaseous refrigerant line for flowing the gaseous refrigerant of low temperature/pressure supplied from the evaporator; and wherein the refrigerant passing through the refrigerant line is overcooled through heat-exchange with the gaseous refrigerant passing through the gaseous refrigerant line.

5. The condenser of claim 1, wherein a heat-isolating portion for preventing heat-exchange with the refrigerant passing through the first heat-radiating portion and the overcooled refrigerant passing through the second heat-radiating portion is formed between the first heat-radiating portion and the second heat-radiating portion.

6. The condenser of claim 5, wherein the heat-isolating portion is receivable of nitrogen therein through a plurality of brazing holes formed along a length direction thereof between the first heat-radiating portion and the second heat-radiating portion.

7. The condenser of claim 1, further comprising an upper cover mounted on an upper surface of the heat-radiating portion and the receiver-drier portion and a lower cover mounted on a lower surface of the receiver-drier portion and the second heat-radiating portion;

wherein a coolant inlet for receiving the coolant and a coolant outlet for exhausting the coolant are formed respectively at one side and an other side of the upper cover, and a refrigerant inlet for receiving the refrigerant from the compressor is formed at the other side of the upper cover.

8. The condenser of claim 7, wherein a refrigerant outlet connected to the expansion valve and a gaseous refrigerant inlet connected to the evaporator are formed at an other side of the lower cover, and a gaseous refrigerant outlet connected to the compressor is formed at one side of the lower cover.

9. The condenser of claim 1, wherein a desiccant for removing moisture remaining in the refrigerant is replaceably provided in the receiver-drier portion.

* * * * *